United States Patent
Ragland et al.

(10) Patent No.: US 12,013,719 B2
(45) Date of Patent: Jun. 18, 2024

(54) METHODS AND APPARATUS TO DYNAMICALLY CONFIGURE OVERCLOCKING FREQUENCY

(71) Applicant: Intel Corporation, Santa Clara, CA (US)

(72) Inventors: Daniel Ragland, Sherwood, OR (US); Nadav Shulman, Tel Mond M (IL); Louis Draghi, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 590 days.

(21) Appl. No.: 17/130,982

(22) Filed: Dec. 22, 2020

(65) Prior Publication Data

US 2021/0109562 A1 Apr. 15, 2021

Related U.S. Application Data

(60) Provisional application No. 63/108,074, filed on Oct. 30, 2020.

(51) Int. Cl.
*G06F 1/10* (2006.01)
*G06F 1/08* (2006.01)
(Continued)

(52) U.S. Cl.
CPC ............ *G06F 1/10* (2013.01); *G06F 1/08* (2013.01); *G06F 1/206* (2013.01); *G06F 1/3206* (2013.01); *G06F 16/9035* (2019.01)

(58) Field of Classification Search
CPC .......... G06F 1/10; G06F 16/9035; G06F 1/08; G06F 1/206; G06F 1/3206
(Continued)

(56) References Cited

U.S. PATENT DOCUMENTS 5,890,997 A * 4/1999 Roth .............. G16H 20/30
                                         482/902
6,208,172 B1 * 3/2001 Evoy .............. G01R 31/30
                                         327/12
(Continued)

FOREIGN PATENT DOCUMENTS

EP      2278432       1/2018
WO      2009114141    9/2009

OTHER PUBLICATIONS

International Searching Authority, "Search Report and Written Opinion," issued in connection with PCT Application No. PCT/US2021/050882, dated Jan. 5, 2022, 10 pages.
(Continued)

*Primary Examiner* — Paul R. Myers
(74) *Attorney, Agent, or Firm* — Hanley, Flight & Zimmerman, LLC

(57) ABSTRACT

Methods, apparatus, and articles of manufacture to dynamically configure overclocking frequency have been disclosed. An example apparatus include a clock rate adjuster to cause a processor core to operate at a first overclocked clock rate; a comparator to compare a sensed temperature corresponding to the processor core to a threshold; and the clock rate adjuster to, when the sensed temperature satisfies the threshold, decrease a clock rate of the processor core from the first overclocked clock rate by a user-defined amount, the decreased clock rate being above a normal operating clock rate of the processor core.

25 Claims, 11 Drawing Sheets

(51) Int. Cl.
  *G06F 1/20* (2006.01)
  *G06F 1/3206* (2019.01)
  *G06F 16/9035* (2019.01)
(58) Field of Classification Search
  USPC .......................................................... 713/500
  See application file for complete search history.

(56) References Cited

U.S. PATENT DOCUMENTS

| | | | |
|---|---|---|---|
| 7,005,871 B1* | 2/2006 | Davies | G01R 31/287 |
| | | | 345/519 |
| 7,219,252 B1 | 5/2007 | Li et al. | |
| 7,382,366 B1* | 6/2008 | Klock | G06F 11/24 |
| | | | 714/E11.154 |
| 7,469,355 B1 | 12/2008 | Chong | |
| 8,006,062 B1* | 8/2011 | Cheng | G06F 9/4401 |
| | | | 711/170 |
| 9,746,898 B2* | 8/2017 | Grossmann | G06F 1/206 |
| 2005/0055597 A1* | 3/2005 | Weng | G06F 1/08 |
| | | | 713/600 |
| 2005/0071705 A1* | 3/2005 | Bruno | G06F 1/206 |
| | | | 713/500 |
| 2007/0250736 A1* | 10/2007 | Gaskins | G06F 1/3203 |
| | | | 713/501 |
| 2007/0250800 A1* | 10/2007 | Keswick | G06F 30/39 |
| | | | 716/139 |
| 2009/0235108 A1* | 9/2009 | Gold | G06F 1/324 |
| | | | 713/500 |
| 2009/0256546 A1* | 10/2009 | Wu | G06F 1/08 |
| | | | 323/318 |
| 2010/0146322 A1* | 6/2010 | Chien | G06F 1/08 |
| | | | 713/600 |
| 2010/0223489 A1* | 9/2010 | Huang | G06F 1/08 |
| | | | 713/300 |
| 2014/0075223 A1* | 3/2014 | Tan | G06F 1/3243 |
| | | | 713/322 |
| 2015/0102791 A1* | 4/2015 | Haider | G05F 1/46 |
| | | | 323/281 |
| 2015/0248312 A1* | 9/2015 | Brochard | G06F 9/4893 |
| | | | 718/103 |
| 2017/0141762 A1* | 5/2017 | Uemura | G01R 31/2601 |
| 2019/0188053 A1* | 6/2019 | Benke | G06F 11/3024 |
| 2019/0369656 A1* | 12/2019 | Han | G06F 9/4403 |
| 2020/0192420 A1* | 6/2020 | Irshad | G09G 5/39 |
| 2021/0109562 A1 | 4/2021 | Ragland et al. | |

OTHER PUBLICATIONS

International Searching Authority, "International Preliminary Report on Patentability," in connection with International Patent Application No. PCT/US2021/050882, dated May 2, 2023, 5 pages.
Intel, "Product Brief Mobile 8th Gen Intel Core Processors," 2018 Intel Corporation, 10 pages.
Harding, "What Is Intel Thermal Velocity Boost? CPUs With TVB Explained," tomsHARDWARE.com, dated Jun. 29, 2020, 8 pages.

* cited by examiner

US 12,013,719 B2

METHODS AND APPARATUS TO DYNAMICALLY CONFIGURE OVERCLOCKING FREQUENCY

RELATED APPLICATION

This patent claims the benefit of U.S. Provisional Application No. 63/108,074, which was filed on Oct. 30, 2020. U.S. Provisional Application No. 63/108,074 is hereby incorporated herein by reference in its entirety. Priority to U.S. Provisional Application No. 63/108,074 is hereby claimed.

FIELD OF THE DISCLOSURE

This disclosure relates generally to processors, and, more particularly, to methods and apparatus to dynamically configure overclocking frequency.

BACKGROUND

A processing unit (e.g., a central processing unit (CPU), a graphical processing unit (GPU) operates according to a clock rate (also referred to as clock speed). The clock rate is a measure of how many clock cycles (e.g., pulses) the processing unit can perform per second. The clock cycle is used to synchronize operation of components of the processing unit. Accordingly, generally, the faster the clock cycles, the faster operations and/or instruction can be executed by the processing unit. Although many devices that include processing units are configured to run at a particular maximum speed (e.g., clock rate), such devices may be configured to overclock the clock rate (e.g., to increase the clock rate above its normal operating level). Overclocking refers to the technique of increasing a components clock rate (e.g., higher the preset configuration of the device).

BRIEF DESCRIPTION OF THE DRAWINGS

The figures are not to scale. In general, the same reference numbers will be used throughout the drawing(s) and accompanying written description to refer to the same or like parts.

Figure 1:
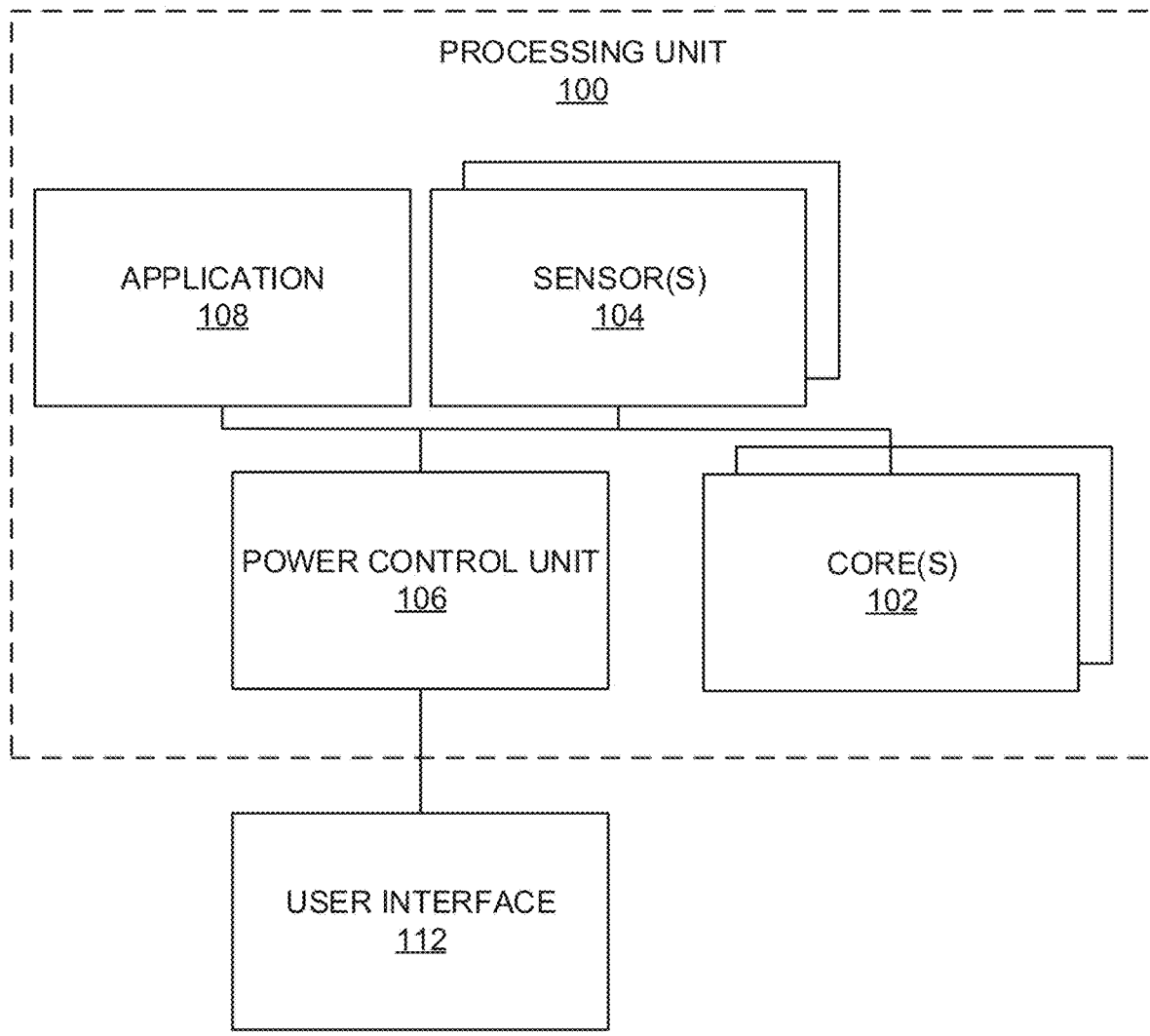
FIG. 1 is a block diagram of an example implementation of a processing unit described in conjunction with examples disclosed herein.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

A processing unit (e.g., a central processing unit (CPU), graphical processing unit (GPU), etc.) is electronic circuitry that executes instructions making up a program or workload. A CPU/GPU may include one or more processor cores to execute the instructions by accessing data from main memory. The speed at which the processor cores execute the instructions correspond to the clock speed of the processing unit. The faster the clock speed, the hotter the temperature of the system. Most computing devices include a preset clock speed for the processing unit. The preset clock speed is a speed where there is limited or no risk of overheating and/or causing damage to the device. Although some devices include a preset clock speed or clock rate (e.g., a normal operating clock rate), a user can enable overclocking to increase the preset clock rate to a higher clock rate for faster computation speed. However, as described above, overclocking increases the temperature of the chip which, if hot enough, will cause damage to the device.

Traditional overclocking techniques allow for preset overclocking configurations. For example, for traditional overclocking techniques a user can only select an overclocked clock speed. In this manner, if the user enables overclocking and the temperature reaches a predefined maximum temperature (e.g., 100° Celsius (C)), the device automatically significantly lowers the clock speed to a preset value (e.g., the normal operating clock rate or clock rate lower than the normal operating clock rate) for a preset amount of time to cool down and protect the device. However such a nonflexible traditional approach only allows for overclocking at a single clock speed and shuts down when the temperature reaches the maximum value.

Examples disclosed herein provide a mechanism for allowing a user to customize overclocking for a dynamic overclocking protocol that can be adjusted based on user and/or manufacturer preferences. In this manner, overclocking can occur at different speeds depending on the temperature of the system (e.g., faster overclocking speeds/frequencies when the temperature is low and slower overclocking speeds/frequencies when the temperature is high to avoid reaching the maximum temperature and the automatic disabling of the overclocking). In some examples, the user can customize the overclocking of the device so that the clock signal can toggle between two overclocked clock signals to keep the temperature within a safe range during overclocking. In some examples disclosed herein, the user and/or manufacturer can set the overclocking preferences based on the number of active cores and/or based on individual cores. In some examples disclosed herein, the rate of temperature increase or decrease (e.g., the slope) may be utilized to determine how to adjust the clock speed (e.g., a faster temperature increase may result in decreasing a clock signal prior to the temperature reaching a threshold).

Additionally, examples disclosed herein allows a user to increase or decrease the supply voltage of a system based on the temperature corresponding to the processing unit. When a silicon-based circuit is operating at a higher temperature, the voltage supply has to be at a particular supply voltage level to ensure proper operation. However, at a lower temperature, the system can properly operate with a lower supply voltage. Accordingly, examples disclosed herein provide a mechanism for allowing a user to decrease the voltage supply when a measure/sensed temperature is below one or more thresholds to conserve power. Examples disclosed herein allows a user and/or manufacturer to customize clocking preferences based on one or more clock speeds for overclocking, one or more temperature thresholds, one or more clock speeds, one or more clock speed decrement or increment values, one or more temperature slope thresholds, one or more supply voltage levels, and/or a number of active cores.

FIG. 1 is a block diagram of an example implementation of an example processing unit 100. The example processing unit 100 of FIG. 1 includes example core(s) 102, example sensor(s) 104, an example application 103, and an example power control unit 106. The example processing unit 100 receives user input from an example user interface 112.

The example processing unit 100 of FIG. 1 is any type of processing unit (e.g., a CPU, a GPU, an accelerated processing unit (APU), general purpose GPU (GPGPU), etc.). For example, the processing unit 100 may be an embedded system, a field programmable gate array, a shared-memory controller, a network on-chip, a networked system, and/or any other circuitry that includes a hardware (e.g., semiconductor based) processor, memory, and/or cache. The example processing unit 100 utilizes processor resources (e.g., the logic circuitry of the example processor core(s) 102) to execute instructions to implement the example application 103.

The example processor core(s) 102 of FIG. 1 execute(s) instructions (e.g., a workload) from the example application 103 (e.g., by reading and/or writing data). The processing unit 100 may enable one or more of the core(s) 102 to execute the instructions. The example processor core(s) execute instructions at a rate corresponding to the clock rate. As described above, when overclocking is enabled, the one or more of the core(s) 102 can operate at a rate higher than the standard rate defined by the processing unit 100. In some examples, the processing unit 100 includes a single clock at which all the core(s) 102 operate according to. In some examples, the processing unit 100 includes multiple clocks (e.g., one for each core 102). In this manner, the example power control unit 106 can control the frequency of the clock signal for individual core(s) 102.

The example application 103 of FIG. 1 may exhibit one or more computation phases to perform one or more tasks. The example application 103 uses the resources of the core(s) 102 to carry out instructions to perform the one or more tasks.

The example senor(s) 104 of FIG. 1 is/are temperature sensor(s) to sense a temperature near the example core(s) 102. The temperature sensor(s) 104 may be a single sensor for a chip that implements the core(s) 102 and/or may be multiple sensor(s) (e.g., one for one or more of the core(s) 102). In some examples, where the core(s) 102 is/are implemented in different chips, there may be multiple sensor(s) 104 to measure temperature(s) of the respective chips and/or core(s) of the respective chips. The example sensor(s) 104 output(s) the measured temperature(s) to the example power control unit 106.

The example power control unit 106 of FIG. 1 dynamically adjusts the clock rate when overclocking is enabled and/or the supply voltage level based on at least one of (a) one or more temperature readings, (b) the number of active core(s) 102, and (c) the rate of increase or decrease of the temperature. The example power control unit 106 adjusts the clock rate based on user and/or manufacturer (e.g., preset) selected overclocking preferences. In this manner, the user can define (a) the overclock rate, (b) one or more temperature and/or slope thresholds to adjust the overclock rate, and (c) by how much to adjust the overclock rate when the temperature reaches the one or more thresholds. The preferences may be on an individual core basis or based on a group and/or number of active cores (e.g., if 1 core is active, apply first overclocking preferences; if 2 cores are active, apply second overclocking preferences; etc.). The power control unit 106 ensures that the user and/or manufacturer overclocking preferences are applied to the core(s) 102 as overclock configurations. Accordingly, the example power control unit 106 obtains temperature(s) from the sensor(s) 104 and/or determines how many of the example core(s) 102 are active and compares the obtained data to the overclock configurations defined by the user and/or manufacturer preferences to determine how to dynamically adjust the clocking frequency and/or supply voltage. The example power control unit 106 obtains the user preferences by displaying a prompt to a user via the example user interface 112 and obtains user entered data from the prompt to convert clocking preferences into clock configurations that the power control unit 106 uses to dynamically adjust the clock frequency and/or supply voltage.

In some examples, the power control unit 106 of FIG. 1 stores one or more prior temperature measurements to help adjust clocking based on historical data. For example, the power control unit 106 may store prior temperature measurements in order to determine a rate of change, which also may be used to dynamically adjust the clock signal frequency and/or supply voltage. In some examples, the power control unit 106 analyzes effects of a change to clocking frequency and/or supply voltage to determine an increment/decrement amount for a subsequent clock rate adjustment. For example, if user or manufacturer selects a decrease of 0.5 gigahertz (GHz) for a core when the temperature corresponding to the core is above 50° C. and a 0.1 GHz increase when the temperature is below 46° C., the power control unit 106 may process the resulting temperatures corresponding to the cores 102 based on such overclocking characteristics. The power control unit 106 uses the results to determine that reducing the clock rate by 0.5 GHz reduces the temperature by much more than anticipated, thereby causing the core to operate at the lower clock frequency for a duration that is longer than necessary. In such an example, the power control unit 106 may suggest (e.g., by transmitting a prompt via the example user interface 112) and/or may automatically reduce the 0.5 GHz decrease to a smaller amount, thereby causing the temperature decrease triggered by the adjustment to lesson which results in the lower clocking frequency be applied for less time. In some examples, the power control unit 106 may calculate a suggested amount by using statistical analysis of the operation of the cores and the corresponding clocking frequencies and/or corresponding temperatures. The example power control unit 106 is further described below in conjunction with FIG. 2.

The example user interface 112 of FIG. 1 displays the prompt generated by the example power control unit 106. Additionally, the user interface 112 obtains overclocking preferences from the user and provides the overclocking preferences to the power control unit 106. In some examples, the user interface 112 transmits a prompt to suggest adjusting the preferences (e.g., based on historic data) and/or may let the user know that the configurations have been adjusted based on historic data.

Figure 2:
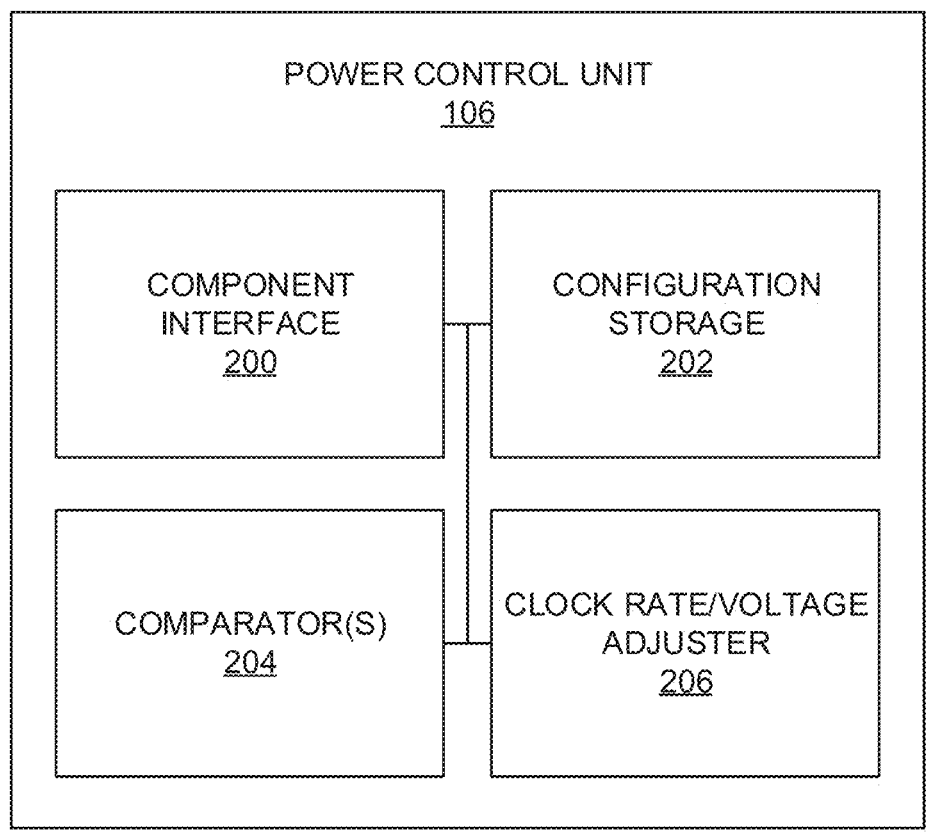
FIG. 2 is a block diagram of an example implementation of the power control unit of FIG. 1.

FIG. 2 is a block diagram of an example implementation of the power control unit 106 of FIG. 1. The example power control unit 106 includes an example component interface 200, example configuration storage 202, example comparator(s) 204, and the example clock rate/voltage adjuster 206.

The example component interface 200 of FIG. 2 transmits and/or obtains data from other components. For example, the component interface 200 transmits prompts to the user interface 112 and/or obtains user preferences from the user interface 112. Additionally, the component interface 200 interfaces with the sensor(s) 104 to obtain temperature measurements. Additionally, the component interface 200 interfaces with the core(s) 102 to determine how many of the core(s) 102 are active at a given point in time. Additionally, the example interface 200 interfaces with one or more clocks of the processing unit 100 and/or the core(s) 102 to instruct the clock to increate and/or decrease the clock rate according to the overclocking configurations. In some examples, the interface 200 interfaces with the processing unit 100 and/or one or more of the core(s) 102 to instruct the one or more core(s) 102 and/or other components of the processing unit 100 to adjust the supply voltage level based on the obtained temperature(s).

The example configuration storage 202 of FIG. 2 stores overclocking configuration details. For example, the configuration storage 202 stores pre-selected and/or user selected temperature thresholds, slopes, incremental increases, incremental decreases, supply voltages, etc. based on the user (e.g., via the user interface 112) and/or manufacturer (e.g., preset) overclocking preferences. In this manner, the example comparator(s) 204 can compare obtained temperatures and/or determined a rate of change of the temperature to various threshold(s) based on the user and/or manufacturer overclocking preferences. In some examples, the user provides supply voltages in conjunction with a particular temperature, change in temperature, clock rate/frequency, change in clock rate frequency, and/or number of active cores. In this manner, the power control unit 106 can adjust the supply voltage based on temperature, clock rate, and/or number of active cores. In some examples, the configuration storage 202 stores previous temperature readings and stores them in conjunction with core context information (e.g., a timestamp of a temperature measurement, clock speed(s) at the temperature measurement, a number of cores operating at the time or the temperature measurement, etc.). In this manner, the comparator(s) 204 can compare historical data to patterns for suggesting different overclocking configurations based on the historical data.

The example comparator(s) 204 compare(s) obtained temperature measurements from the example sensor(s) 104 to one or more thresholds defined by the overclocking configurations stored in the example configuration storage 202. For example, if the overclocking configuration corresponds to reducing an overclocking clock speed of a particular core by 0.1 GHz when the temperature corresponding to the core is above 50° C., then the comparator(s) 204 compare(s) a temperature from the sensor 104 that corresponds to the core and compares the temperature to the 50 ° C. threshold to determine whether or not the temperature is above or below the threshold. In some examples, the threshold may be based on temperature and a number of active cores. For example, the overclocking configuration may correspond to adjusting the overclocking frequency when three of the cores 102 are active and the temperature corresponding to the three cores 102 is above 60° C. or below 45° C. In such example, the comparator(s) 204 identify(ies) how many of the core(s) 102 are active and the temperature corresponding to the active cores and outputs a value indicating when 3 cores are active and the temperature is outside of the 45° C. to 60° C. range. The output of the comparator(s) 204 (e.g., the value corresponding to whether a sensed temperatures satisfies one or more thresholds) is/are transmitted to the clock rate/voltage adjuster 206 to adjust a clock rate and/or supply voltage of the processing unit 100 based on the comparison.

The example clock rate/voltage adjuster 206 of FIG. 2 adjusts an overclocked clock rate to increase or decrease the block frequency based on the output of the comparator(s) 204. The example clock rate/voltage adjuster 206 adjusts the clock frequency based on an amount defined by the overclocking configurations. For example, if the overclocking configurations correspond to decreasing the clock rate for a particular core by 0.2 GHz when the temperature corresponding to the particular core is above 50° C., and the comparator 204 outputs a signal that identifies that the temperature corresponding to the particular core is above 50° C., the clock rate/voltage adjuster 206 accesses the configuration storage 202 to determine that the clocking frequency for the particular core should be adjusted by 0.2 GHz and sends a signal to the processing unit 100 and/or the particular core to instruct the core to decrease the clock signal by 0.2 GHz. Additionally, the example clock rate/voltage adjuster 206 may adjust the supply voltage used by the example processing unit 100 to conserve energy when the measured temperature is below one or more thresholds (e.g., defined by a user and/or manufacturer and stored in the example configuration storage 202), and/or based on the clock rate and/or number of active cores. The processing unit 100 can operate with a lower supply voltage when the silicon components are lower in temperature, the clock rate is slower, and/or the number of active cores are lower and require a higher supply voltage to operate when the silicon components are higher in temperature the clock rate is faster, and/or the number of active cores are higher. Accordingly, a user and/or manufacturer may select one or more temperature thresholds, clock rate thresholds, and/or number of active cores corresponding to one or more (or a group) of the cores 102 to adjust the supply voltage to conserve energy. Thus, the example clock rate/voltage adjuster 206 may transmit instructions to the example processing unit 100 and/or the one or more core(s) 102 to decrease the supply voltage when the temperature is below the one or more temperature thresholds, the clock rate is below a threshold, and/or the number of active cores is below a threshold. The example clock rate/voltage adjuster 206 may be a single component (e.g., a component that adjusts both clock rate and supply voltage) or may be two components (e.g., a first component to adjust clock rate and a second component to adjust supply voltage).

While an example manner of implementing the example power control unit 112 is illustrated in FIGS. 1 and/or 2, one or more of the elements, processes and/or devices illustrated in FIGS. 1 and/or 2 may be combined, divided, re-arranged, omitted, eliminated and/or implemented in any other way. Further, the example component interface 200, the example configuration storage 202, the example comparator(s) 204, the example clock rate/voltage adjuster 206, and/or, more generally, the example power control unit 106 of FIG. 2 may be implemented by hardware, software, firmware and/or any combination of hardware, software and/or firmware. Thus, for example, any of the example component interface 200, the example configuration storage 202, the example comparator(s) 204, the example clock rate/voltage adjuster 206, and/or, more generally, the example power control unit 106 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example component interface 200, the example configuration storage 202, the example comparator(s) 204, the example clock rate/voltage adjuster 206, and/or, more generally, the example power control unit 106 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example power control unit 106 may include one or more elements, processes and/or devices in addition to, or instead of, those illustrated in FIGS. 1 and/or 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the example power control unit 106 of FIGS. 1 and/or 2 are shown in FIGS. 3-8. The machine readable instructions may be one or more executable programs or portion(s) of an executable program for execution by a computer processor such as the processor 1012 shown in the example processor platform 1000 discussed below in connection with FIG. 10. The program(s) may be embodied in software stored on a non-transitory computer readable storage medium such as a CD-ROM, a floppy disk, a hard drive, a DVD, a Blu-ray disk, or a memory associated with the processor 1012, but the entirety of the program(s) and/or parts thereof could alternatively be executed by a device other than the processor 1012 and/or embodied in firmware or dedicated hardware. Further, although the example program(s) is/are described with reference to the flowchart illustrated in FIG. 10, many other methods of implementing the example power control unit 106 of FIGS. 1 and/or 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 3-8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 3:
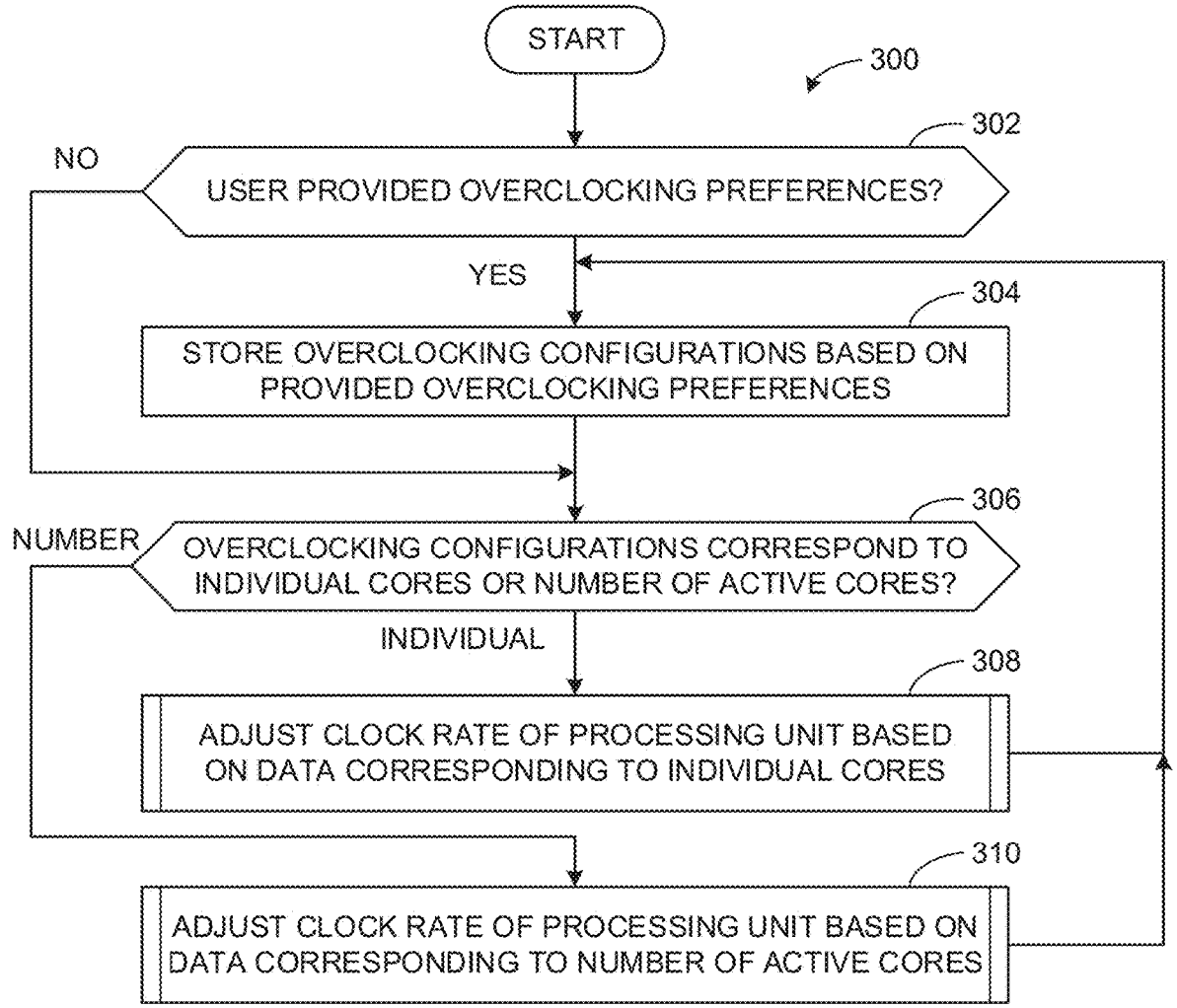
FIGS. 3-8 illustrate flowcharts representative of example machine readable instructions that may be executed to implement the power control unit of FIG. 2.

FIG. 3 illustrates a flowchart representative of example machine readable instructions 300 that may be executed to implement the example power control unit 106 (FIGS. 1 and/or 2) to adjust a clock rate for the processing unit 100 of FIG. 1. Although the flowchart of FIG. 3 is described in conjunction with the example power control unit 106 of the example processing unit 100, other type(s) of power control units(s), and/or other type(s) of processing unit(s) may be utilized instead. Additionally, although the example instructions 300 correspond to updating an overclocked clock rate based on temperature, the instructions 300 could be used in conjunction with any clock rate.

At block 302, the example component interface 200 determines if the user provided overclocking preferences via the example user interface 112. The component interface 200 may cause display of a prompt to the user to allow the user to select the overclocking preferences (e.g., when to increment or decrement the clock rate of one or more cores(s), by how much, etc.). If the example component interface 200 determines that the user has not provided overclocking preferences (block 302: NO), control continues to block 306 and the power control unit 106 uses the preset or prestored configurations stored in the example configuration storage 202. If the example component interface 200 determines that the user has provided overclocking preferences (block 302: YES), the example configuration storage 202 stores overclocking configurations based on the provided overclocking preferences (e.g., obtained from the user interface 112) (block 304).

At block 306, the example comparator(s) 204 accesses the stored overclocking configurations stored in the example configuration storage 202 to determine is the overclocking configurations correspond to individual scores or a number of active cores. As described above, the overclocking configurations may be based on individual cores, a group of cores, and/or a number of active cores. If the example comparator(s) 204 determines that the overclocking configurations (e.g., stored in the configuration storage 202) is based on individual cores (block 306: INDIVIDUAL), the example power control unit 106 adjusts the clock rate of the processing unit 100 based on data corresponding to the individual cores 102 (block 308), as further described below in conjunction with FIG. 4. If the example comparator(s) 204 determines that the overclocking configurations (e.g., stored in the configuration storage 202) is based on a number of active cores (block 306: NUMBER), the example power control unit 106 adjusts the clock rate of the processing unit 100 based on data corresponding to the number of active cores 102 (block 310), as further described below in conjunction with FIG. 5.

Figure 4:
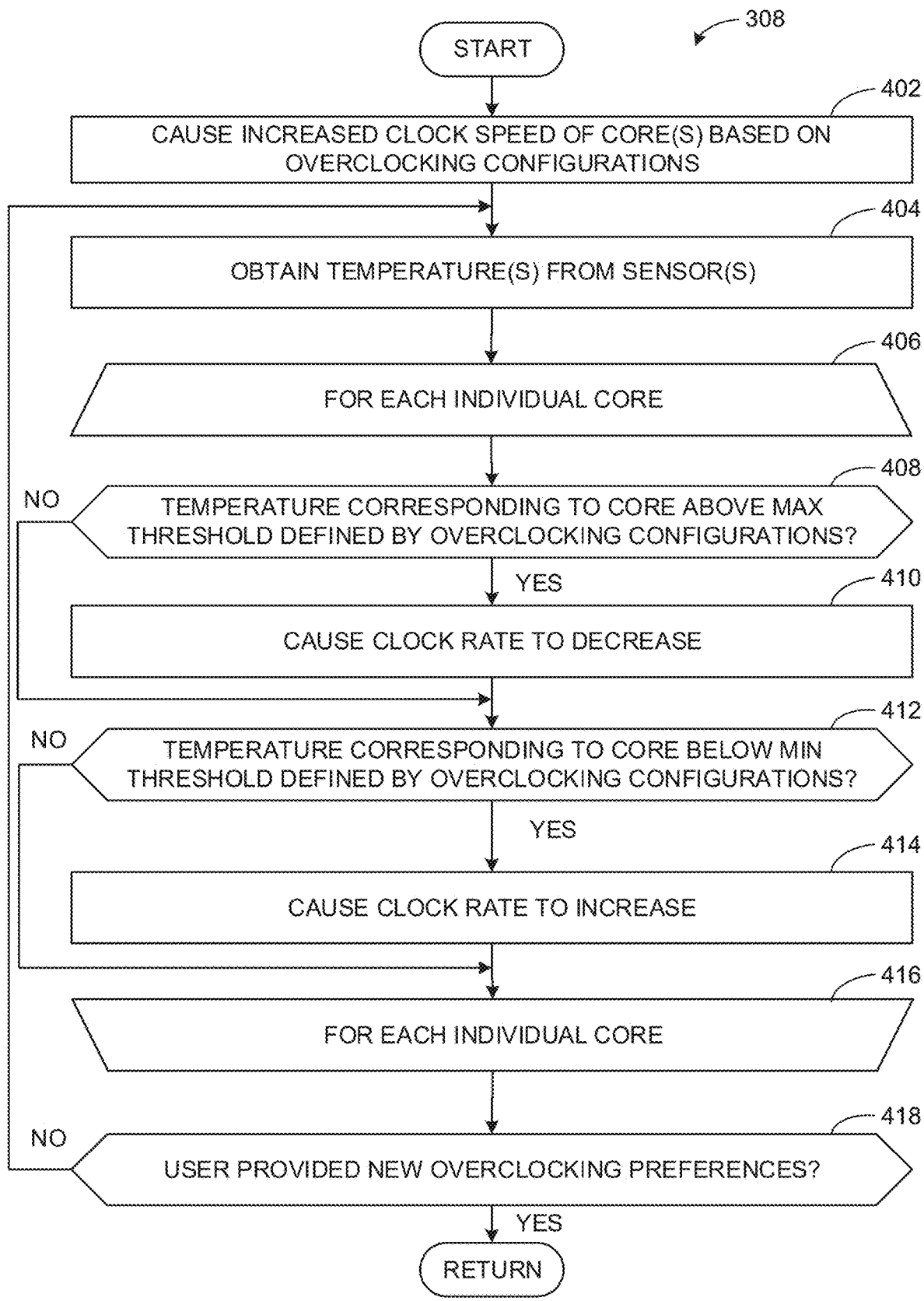

FIG. 4 illustrates a flowchart representative of example machine readable instructions 308 that may be executed to implement the power control unit 106 to adjust clock rate of the processing unit 100 based on the data corresponding to individual cores 102. Although the flowchart of FIG. 4 is described in conjunction with the example power control unit 106 of the example processing unit 100, other type(s) of power control units(s), and/or other type(s) of processing unit(s) may be utilized instead. Additionally, although the example instructions 400 correspond to updating an overclocked clock rate based on temperature, the instructions 300 could be used in conjunction with any clock rate.

At block 402, the example clock rate/voltage adjuster 206 causes an increased clock speed (e.g., clock rate) of one or more of the core(s) 102 based on the overclocking configurations. For example, the clock rate/voltage adjuster 206 will initiate overclocking by increasing the clock rate of one or more of the core(s) 102 to an overclocked clock rate defined by the overclocking configurations. At block 404, the example component interface 200 obtains temperature measurement(s) from one or more of the sensor(s) 104 of FIG. 1.

For each of the individual core(s) 102 (blocks 406-416), the example comparator(s) 204 determine(s) if the temperature corresponding to the individual core is above (e.g., satisfies) a maximum threshold defined by the overclocking configurations (block 408). For example, the comparator(s) 204 access(es) a first temperature threshold (e.g., a maximum temperature threshold) corresponding to the core and compares the obtained temperature for the core to the corresponding first temperature threshold. In some examples, the comparator(s) 204 may determine the slope or rate of change of the temperature by comparing the temperature to a previous temperature taken at a previous point in time. In such examples, the comparator(s) may compare the rate of change/slope of the temperature to a user-defined slope threshold in addition to or instead of the single temperature comparison.

If the example comparator(s) 204 determine(s) that the measured temperature corresponding to the individual core is not above the first threshold defined by the overclocking configurations (block 408: NO), control continues to block

412. If the example comparator(s) 204 determine(s) that the measured temperature corresponding to the individual core is above the first threshold defined by the overclocking configurations (block 408: YES), the example clock rate/voltage adjuster 206 causes the clock rate of the individual core to decrease by an amount defined by the overclocking configurations (block 410) (e.g., by sending a signal to the processing unit 100 and/or the individual core 102). Decreasing the clock rate for the individual core will either reduce the temperature and/or decrease the rate of increase in temperature.

At block 412, the example comparator(s) 204 determine(s) if the temperature corresponding to the individual core is below (e.g., satisfies) a minimum threshold defined by the overclocking configurations (block 408). For example, the comparator(s) 204 access(es) a second temperature threshold (e.g., a minimum temperature threshold) corresponding to the core and compares the obtained temperature for the core to the corresponding second temperature threshold. In some examples, the comparator(s) 204 may determine the slope or rate of change of the temperature by comparing the temperature to a previous temperature taken at a previous point in time. In such examples, the comparator(s) may compare the rate of change/slope of the temperature to a user-defined slope threshold in addition to or instead of the single temperature comparison.

If the example comparator(s) 204 determine(s) that the measured temperature corresponding to the individual core is not below the second threshold defined by the overclocking configurations (block 412: NO), control continues to block 416. If the example comparator(s) 204 determine(s) that the measured temperature corresponding to the individual core is below the second threshold defined by the overclocking configurations (block 412: YES), the example clock rate/voltage adjuster 206 causes the clock rate of the individual core to increase by an amount defined by the overclocking configurations (block 410) (e.g., by sending a signal to the processing unit 100 and/or the individual core 102). Increasing the clock rate for the individual core will either increase the temperature and/or decrease the rate of decrease in temperature.

At block 418, the example configuration storage 202 determines if a user provided new/updated overclocking preferences (e.g., new overclocking preferences were obtained from the user interface 112 via the component interface 200). If the example configuration storage 202 determines that the user has not provided new/updated overclocking preferences (block 418: NO), control returns to block 404. If the example configuration storage 202 determines that the user has provided new/updated overclocking preferences (block 418: YES), control returns to block 304 of FIG. 3.

Figure 5:
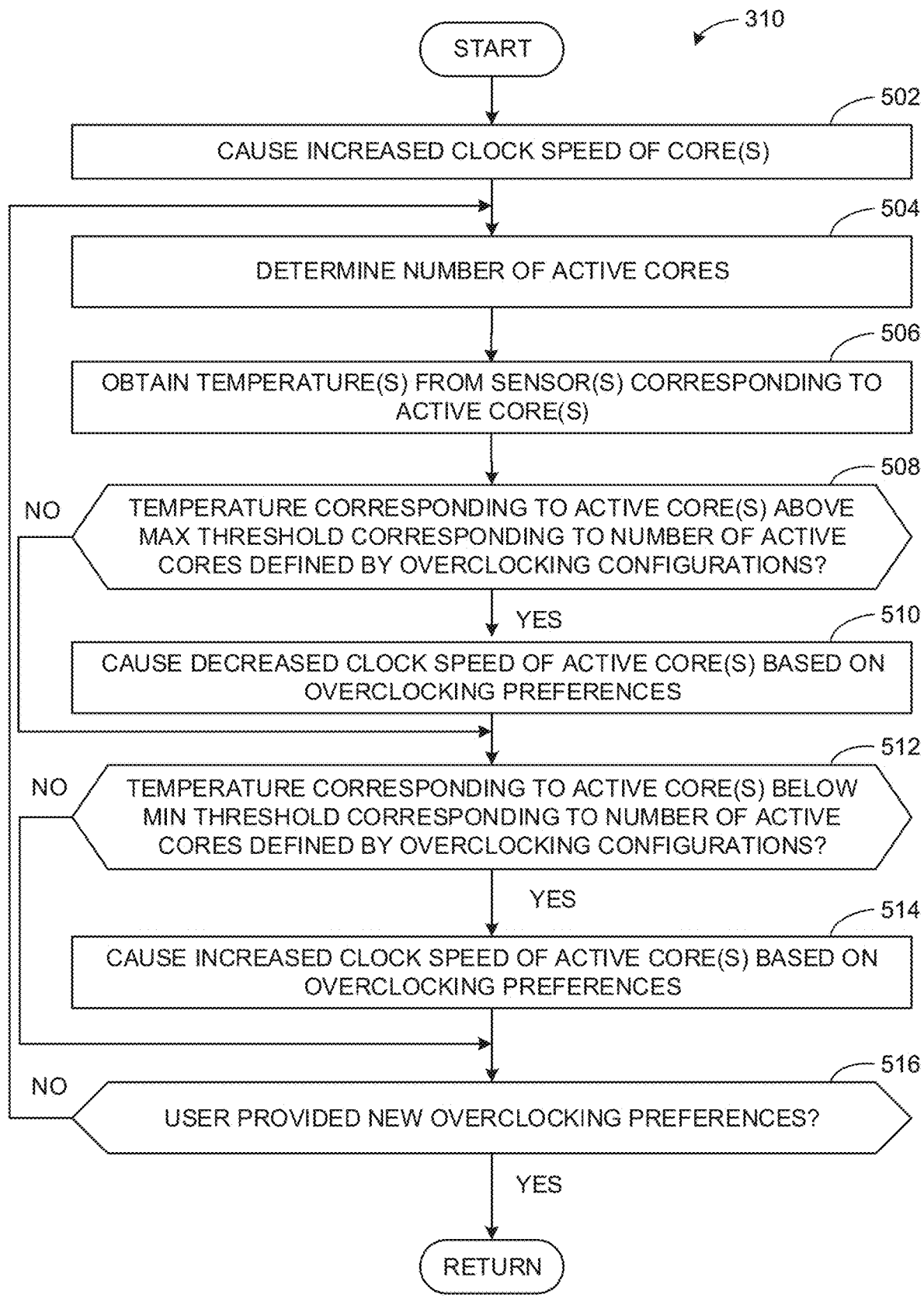

FIG. 5 illustrates a flowchart representative of example machine readable instructions 310 that may be executed to implement the power control unit 106 to adjust a clock rate of the processing unit 100 based on the data corresponding to an amount of active cores. Although the flowchart of FIG. 5 is described in conjunction with the example power control unit 106 of the example processing unit 100, other type(s) of power control units(s), and/or other type(s) of processing unit(s) may be utilized instead. Additionally, although the example instructions 500 correspond to updating an overclocked clock rate based on temperature, the instructions 300 could be used in conjunction with any clock rate.

At block 502, the example clock rate/voltage adjuster 206 causes an increased clock speed (e.g., clock rate) of one or more of the core(s) 102 based on the overclocking configurations. For example, the clock rate/voltage adjuster 206 will initiate overclocking by increasing the clock rate of one or more of the core(s) 102 to an overclocked clock rate defined by the overclocking configurations. At block 504, the example interface 200 interfaces with the cores 102 to determine the number of active cores. At block 506, the example component interface 200 obtains temperature measurement(s) from one or more of the sensor(s) 104 of FIG. 1.

At block 508, the example comparator(s) 204 determine(s) if the temperature corresponding to the active cores is above (e.g., satisfies) a maximum threshold corresponding to the number of active cores defined by the overclocking configurations. For example, the comparator(s) 204 access(es) a first temperature threshold (e.g., a maximum temperature threshold) corresponding to the number of active cores and compares the obtained temperature for the active cores to the corresponding first temperature threshold. In some examples, the comparator(s) 204 may determine the slope or rate of change of the temperature by comparing the temperature to a previous temperature taken at a previous point in time. In such examples, the comparator(s) may compare the rate of change/slope of the temperature to a user-defined slope threshold in addition to or instead of the single temperature comparison.

If the example comparator(s) 204 determine(s) that the measured temperature corresponding to the active core is not above the first threshold for the number of active cores defined by the overclocking configurations (block 508: NO), control continues to block 512. If the example comparator(s) 204 determine(s) that the measured temperature corresponding to the active core is above the first threshold for the number of active cores defined by the overclocking configurations (block 508: YES), the example clock rate/voltage adjuster 206 causes the clock rate of the active cores to decrease by an amount defined by the overclocking configurations (block 510) (e.g., by sending a signal to the processing unit 100 and/or the individual core 102). Decreasing the clock rate for the individual core will either reduce the temperature and/or decrease the rate of increase in temperature.

At block 512, the example comparator(s) 204 determine(s) if the temperature corresponding to the active cores is below (e.g., satisfies) a minimum threshold corresponding to the number of active cores defined by the overclocking configurations. For example, the comparator(s) 204 access(es) a second temperature threshold (e.g., a minimum temperature threshold) corresponding to the number of active cores and compares the obtained temperature for the active cores to the corresponding second temperature threshold. In some examples, the comparator(s) 204 may determine the slope or rate of change of the temperature by comparing the temperature to a previous temperature taken at a previous point in time. In such examples, the comparator(s) may compare the rate of change/slope of the temperature to a user-defined slope threshold in addition to or instead of the single temperature comparison.

If the example comparator(s) 204 determine(s) that the measured temperature corresponding to the active core is not below the second threshold for the number of active cores defined by the overclocking configurations (block 512: NO), control continues to block 516. If the example comparator(s) 204 determine(s) that the measured temperature corresponding to the active core is above the second threshold for the number of active cores defined by the overclocking configurations (block 512: YES), the example clock rate/voltage adjuster 206 causes the clock rate of the active cores to increase by an amount defined by the overclocking configurations (block 514) (e.g., by sending a signal to the processing unit 100 and/or the individual core 102). Increasing the clock rate for the individual core will either increase the temperature and/or decrease the rate of decrease in temperature.

At block 516, the example configuration storage 202 determines if a user provided new/updated overclocking preferences (e.g., new overclocking preferences were obtained from the user interface 112 via the component interface 200). If the example configuration storage 202 determines that the user has not provided new/updated overclocking preferences (block 516: NO), control returns to block 504. If the example configuration storage 202 determines that the user has provided new/updated overclocking preferences (block 516: YES), control returns to block 304 of FIG. 3.

Figure 6:
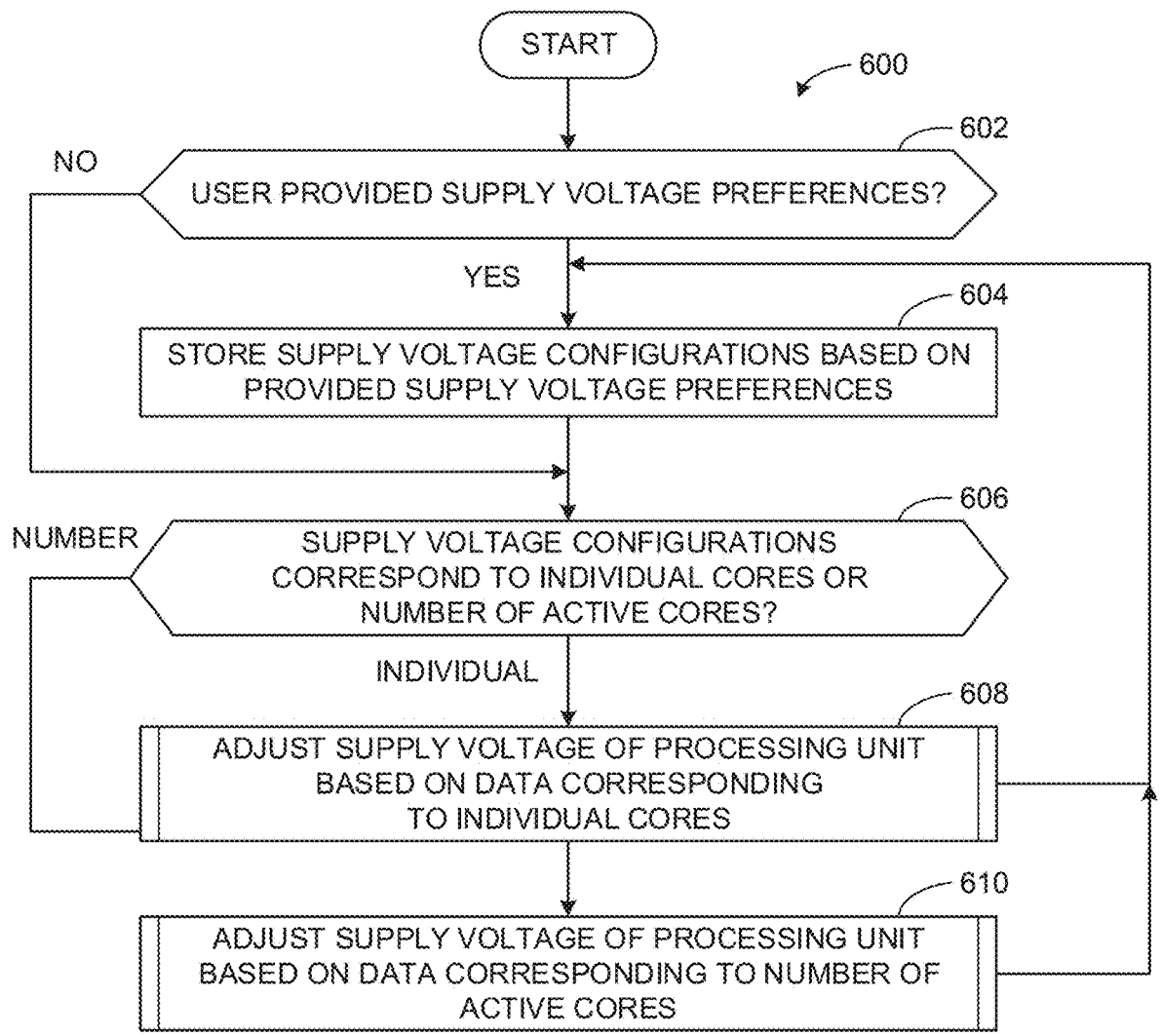

FIG. 6 illustrates a flowchart representative of example machine readable instructions 600 that may be executed to implement the example power control unit 106 (FIGS. 1 and/or 2) to adjust one or more supply voltages for the processing unit 100 of FIG. 1. Although the flowchart of FIG. 6 is described in conjunction with the example power control unit 106 of the example processing unit 100, other type(s) of power control units(s), and/or other type(s) of processing unit(s) may be utilized instead. Additionally, the example instructions 600 may correspond to updating a supply voltage during overclocking or regular operation of the processing unit 100.

At block 602, the example component interface 200 determines if the user has provided supply voltage preferences via the example user interface 112. The component interface 200 may cause display of a prompt to the user to allow the user to select the supply voltage preferences (e.g., when to increment or decrement the supply voltage of one or more cores(s), by how much, etc.). If the example component interface 200 determines that the user has not provided supply voltage preferences (block 602: NO), control continues to block 606 and the power control unit 106 uses the preset or prestored configurations stored in the example configuration storage 202. If the example component interface 200 determines that the user has provided supply voltage preferences (block 602: YES), the example configuration storage 202 stores supply voltage configurations based on the provided supply voltage preferences (e.g., obtained from the user interface 112) (block 604).

At block 606, the example comparator(s) 204 accesses the stored supply voltage configurations stored in the example configuration storage 202 to determine is the supply voltage configurations correspond to individual scores or a number of active cores. As described above, the supply voltage configurations may be based on individual cores, a group of cores, and/or a number of active cores. If the example comparator(s) 204 determines that the supply voltage configurations (e.g., stored in the configuration storage 202) is based on individual cores (block 606: INDIVIDUAL), the example power control unit 106 adjusts the supply voltage of the processing unit 100 based on data corresponding to the individual cores 102 (block 608), as further described below in conjunction with FIG. 7. If the example comparator(s) 204 determines that the supply voltage configurations (e.g., stored in the configuration storage 202) is based on a number of active cores (block 606: NUMBER), the example power control unit 106 adjusts the supply voltage of the processing unit 100 based on data corresponding to the number of active cores 102 (block 610), as further described below in conjunction with FIG. 8.

Figure 7:
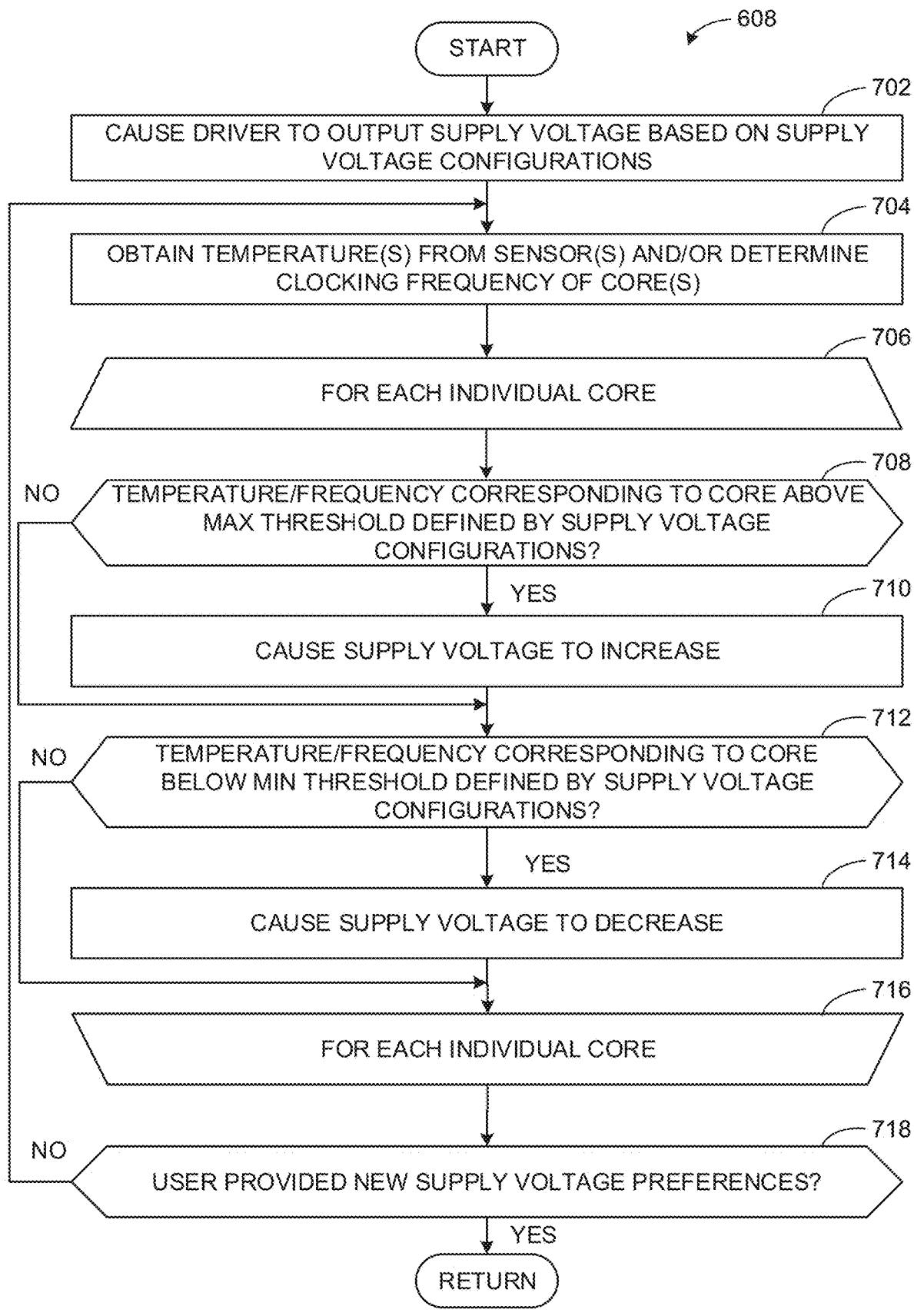

FIG. 7 illustrates a flowchart representative of example machine readable instructions 608 that may be executed to implement the power control unit 106 to adjust one or more supply voltages of the processing unit 100 based on the data corresponding to individual cores 102. Although the flowchart of FIG. 7 is described in conjunction with the example power control unit 106 of the example processing unit 100, other type(s) of power control units(s), and/or other type(s) of processing unit(s) may be utilized instead. In some examples, the instructions 600 correspond to updating of a supply voltage during overclocking or regular operation of the processing unit 100.

At block 702, the example clock rate/voltage adjuster 206 causes a voltage driver of one or more of the core(s) 102 to output a supply voltage at a first voltage based on the supply voltage configurations. For example, the clock rate/voltage adjuster 206 will initiate supply voltage to the first voltage defined by the supply voltage configurations. At block 704, the example component interface 200 obtains temperature measurement(s) from one or more of the sensor(s) 104 of FIG. 1 and/or may determine the clocking frequencies of one or more of the core(s) 102.

For each of the individual core(s) 102 (blocks 706-416), the example comparator(s) 204 determine(s) if the temperature and/or the frequency corresponding to the individual core is above (e.g., satisfies) a corresponding maximum threshold (e.g., a maximum temperature threshold and/or a maximum frequency threshold) defined by the supply voltage configurations (block 708). For example, the comparator(s) 204 access(es) a first temperature threshold (e.g., a maximum temperature threshold) and/or a first frequency threshold (e.g., a maximum frequency threshold) corresponding to the core and compares the obtained temperature and/or determined frequency for the core to the corresponding first corresponding threshold. In some examples, the comparator(s) 204 may determine the slope or rate of change of the temperature by comparing the temperature to a previous temperature taken at a previous point in time. In such examples, the comparator(s) may compare the rate of change/slope of the temperature to a user-defined slope threshold in addition to or instead of the single temperature comparison.

If the example comparator(s) 204 determine(s) that the measured temperature and/or determined frequency corresponding to the individual core is not above the first corresponding threshold defined by the supply voltage configurations (block 708: NO), control continues to block 712. If the example comparator(s) 204 determine(s) that the measured temperature and/or frequency corresponding to the individual core is above the first corresponding threshold defined by the supply voltage configurations (block 708: YES), the example clock rate/voltage adjuster 206 causes the driver to increase the supply voltage by an amount defined by the supply voltage configurations (block 710) (e.g., by sending a signal to the processing unit 100 and/or the individual core 102). Increasing the supply voltage for the individual core will ensure that the core can properly operate (e.g., the higher the temperature and/or clock rate, the more supply voltage needed to operate without error).

At block 712, the example comparator(s) 204 determine(s) if the temperature and/or clock frequency corresponding to the individual core is below (e.g., satisfies) a corresponding minimum threshold (e.g., a minimum temperature threshold and/or a minimum clock frequency threshold) defined by the supply voltage configurations (block 708). For example, the comparator(s) 204 access(es) a second temperature threshold (e.g., a minimum temperature threshold) and/or a second clock rate threshold (e.g., a minimum clock rate threshold) corresponding to the core and compares the obtained temperature and/or clock rate for the core to the second corresponding threshold. In some examples, the comparator(s) 204 may determine the slope or rate of change of the temperature by comparing the temperature to a previous temperature taken at a previous point in time. In such examples, the comparator(s) may compare the rate of change/slope of the temperature to a user-defined slope threshold in addition to or instead of the single temperature comparison.

If the example comparator(s) 204 determine(s) that the measured temperature and/or clock rate corresponding to the individual core is not below the second corresponding threshold defined by the overclocking configurations (block 712: NO), control continues to block 716. If the example comparator(s) 204 determine(s) that the measured temperature and/or determined clock rate corresponding to the individual core is below the second corresponding threshold defined by the supply voltage configurations (block 712: YES), the example clock rate/voltage adjuster 206 causes the driver of the corresponding core(s) to decrease the supply voltage (block 710) (e.g., by sending a signal to the processing unit 100 and/or the individual core 102). Decreasing the supply voltage for the individual core will save energy while ensuring that the core can properly operate because silicon components can properly operate with a lower supply voltage when the temperature and/or clock frequency of the components are lower.

At block 718, the example configuration storage 202 determines if a user provided new/updated supply voltage preferences (e.g., new supply voltage preferences were obtained from the user interface 112 via the component interface 200). If the example configuration storage 202 determines that the user has not provided new/updated supply voltage preferences (block 718: NO), control returns to block 704. If the example configuration storage 202 determines that the user has provided new/updated supply voltage preferences (block 718: YES), control returns to block 604 of FIG. 6.

Figure 8:
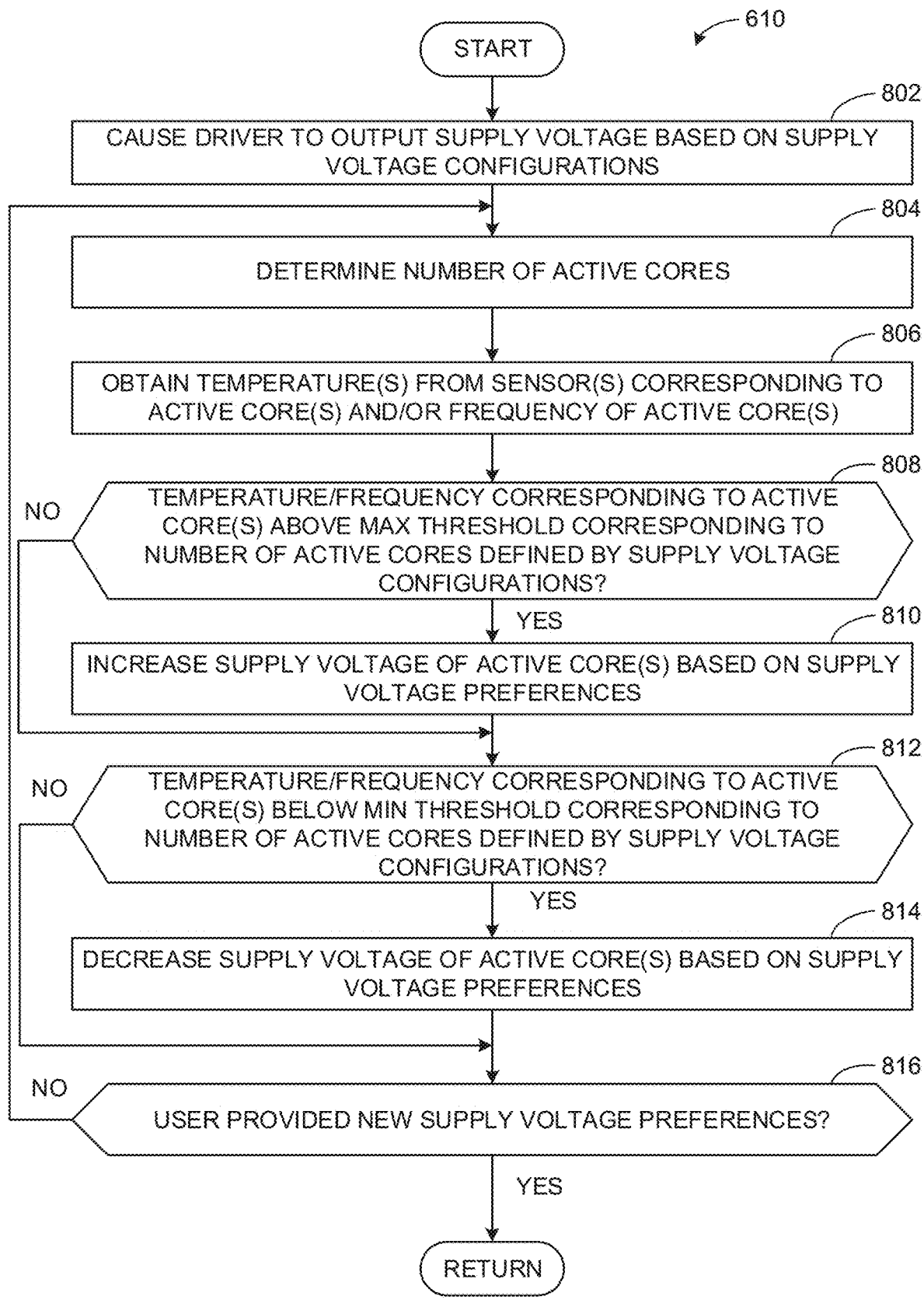

FIG. 8 illustrates a flowchart representative of example machine readable instructions 610 that may be executed to implement the power control unit 106 to adjust one or more supply voltages of the processing unit 100 based on the data corresponding to an amount of active cores. Although the flowchart of FIG. 8 is described in conjunction with the example power control unit 106 of the example processing unit 100, other type(s) of power control units(s), and/or other type(s) of processing unit(s) may be utilized instead. Additionally, the example instructions 600 may correspond to updating a supply voltage during overclocking or regular operation of the processing unit 100.

At block 802, the example clock rate/voltage adjuster 206 causes a voltage driver of one or more of the core(s) 102 to output a supply voltage at a first voltage based on the supply voltage configurations. For example, the clock rate/voltage adjuster 206 will initiate supply voltage to the first voltage defined by the supply voltage configurations. At block 804, the example interface 200 interfaces with the cores 102 to determine the number of active cores. At block 806, the example component interface 200 obtains temperature measurement(s) from one or more of the sensor(s) 104 of FIG. 1 and/or determines or obtains the clock rates from the cores 102.

At block 808, the example comparator(s) 204 determine(s) if the temperature corresponding to the active cores and/or the clock rates of the active cores is above (e.g., satisfies) a corresponding maximum threshold (e.g., a maximum temperature threshold or a maximum clock rate threshold) corresponding to the number of active cores defined by the supply voltage configurations. For example, the comparator(s) 204 access(es) a first temperature threshold (e.g., a maximum temperature threshold) and/or a first clock rate threshold (e.g., a maximum clock rate threshold) corresponding to the number of active cores and compares the obtained temperature and/or clock rates for the active cores to the corresponding first corresponding threshold. In some examples, the comparator(s) 204 may determine the slope or rate of change of the temperature by comparing the temperature to a previous temperature taken at a previous point in time. In such examples, the comparator(s) may compare the rate of change/slope of the temperature to a user-defined slope threshold in addition to or instead of the single temperature comparison.

If the example comparator(s) 204 determine(s) that the measured temperature and/or clock rates corresponding to the active core(s) is/are not above the first corresponding threshold for the number of active cores defined by the supply voltage configurations (block 808: NO), control continues to block 812. In some examples, the comparator(s) 204 may determine the slope or rate of change of the temperature by comparing the temperature to a previous temperature taken at a previous point in time. In such examples, the comparator(s) may compare the rate of change/slope of the temperature to a user-defined slope threshold in addition to or instead of the single temperature comparison.

If the example comparator(s) 204 determine(s) that the measured temperature and/or clock rates corresponding to the active core(s) is/are above the first corresponding threshold for the number of active cores defined by the supply voltage configurations (block 808: YES), the example clock rate/voltage adjuster 206 causes the supply voltage of the active cores to increase by an amount defined by the supply voltage configurations (block 810) (e.g., by sending a signal to the processing unit 100 and/or the individual core 102). Decreasing the clock rate for the individual core will either reduce the temperature and/or decrease the rate of increase in temperature At block 812, the example comparator(s) 204 determine(s) if the temperature and/or clock rates corresponding to the active cores is below (e.g., satisfies) a corresponding minimum threshold corresponding to the number of active cores defined by the overclocking configurations. For example, the comparator(s) 204 access(es) a second temperature threshold (e.g., a minimum temperature threshold) and/or a second clock rate threshold (e.g., a minimum clock rate threshold) corresponding to the number of active cores and compares the obtained temperature and/or clock rate for the active cores to the corresponding second threshold. If the example comparator(s) 204 determine(s) that the measured temperature and/or clock rate corresponding to the active core is not below the second threshold for the number of active cores defined by the overclocking configurations (block 812: NO), control continues to block 816. If the example comparator(s) 204 determine(s) that the measured temperature and/or clock rate corresponding to the active core is above the second threshold for the number of active cores defined by the overclocking configurations (block 812: YES), the example clock rate/voltage adjuster 206 causes supply voltage of the active cores to decrease by an amount defined by the supply voltage configurations (block 814 (e.g., by sending a signal to the processing unit 100 and/or the individual core 102). Increasing the clock rate for the individual core will either increase the temperature and/or decrease the rate of decrease in temperature.

At block 816, the example configuration storage 202 determines if a user provided new/updated supply voltage preferences (e.g., new supply voltage preferences were obtained from the user interface 112 via the component interface 200). If the example configuration storage 202 determines that the user has not provided new/updated supply voltage preferences (block 816: NO), control returns to block 804. If the example configuration storage 202 determines that the user has provided new/updated supply voltage preferences (block 816: YES), control returns to block 604 of FIG. 6.

Figure 9:
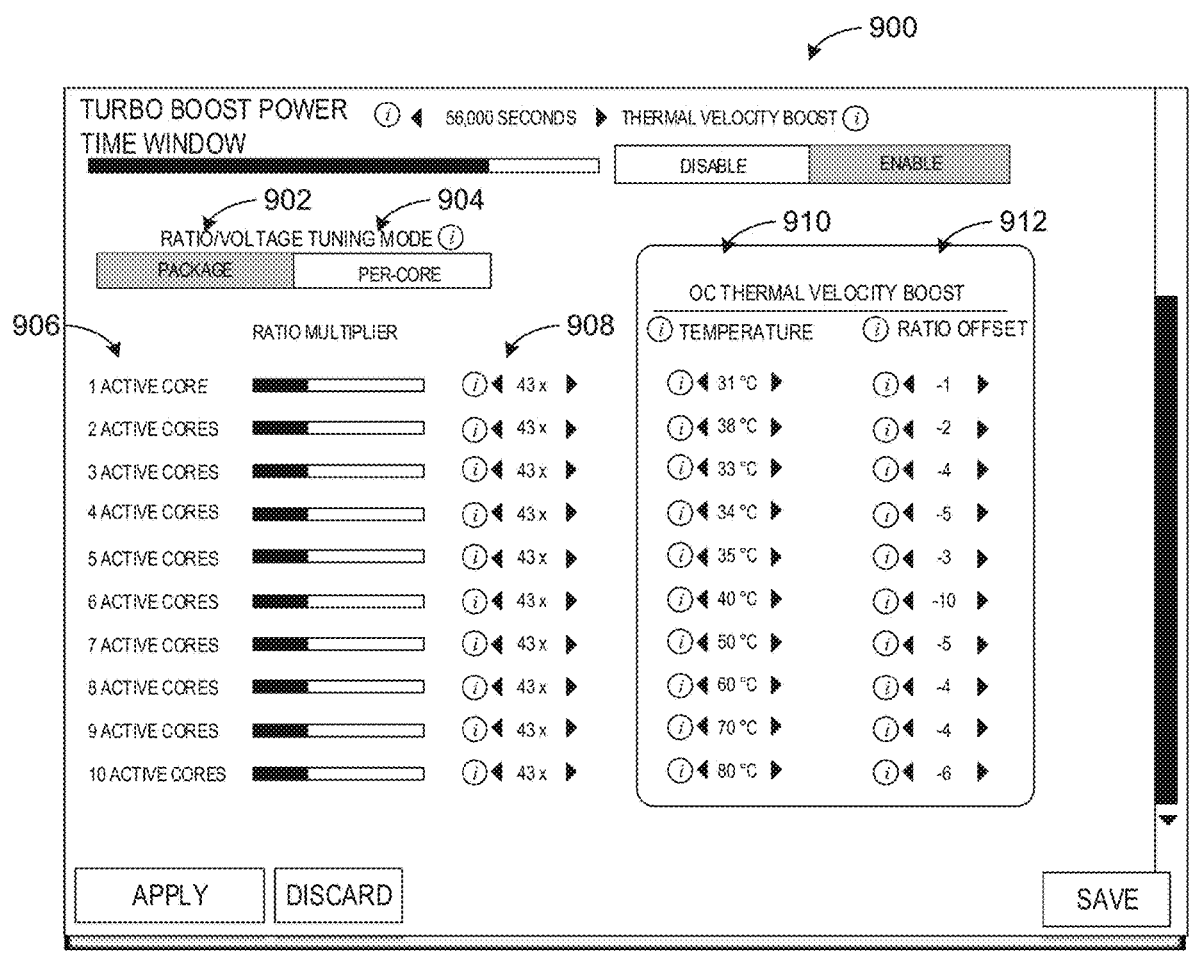
FIG. 9 illustrates an example user interface for configuring overclocking configurations.

FIG. 9 illustrates an example graphical user interface 900 for customizing overclocking preferences. The example graphical user interface 900 includes an example package option 902, an example per-core option 904, an example number of cores options 906, an example initial overclocking frequency option 908, example temperature thresholds 910, and example decrement values 912.

The example graphical user interface 900 of FIG. 2 can be customized to adjust a clocking frequency (e.g., clock rate) based on a number of active cores (e.g., when the package option 902 is selected) or on a per core basis (e.g., when the per core option 904 is selected). In the example of FIG. 98, the package option 902 is enabled. Accordingly, the options are based on the number of active cores 906. The user can select an initial overclocking clock rate using the example initial overclocking frequency option 908. Additionally, the user can select the temperature threshold to initiate a decrement of the clock rate by setting the temperature thresholds 910 based on the number of active cores. When the example per core option 904 is enabled, the user can select a different temperature threshold per core. The user can select by how much to decrement the clock rate by setting the example decrement values 912. In some examples, the interface 900 can include other thresholds (e.g., a minimum threshold, one or more temperature slope thresholds, etc.) with other value for incrementing and/or decrementing the clock rate.

Although the example interface 900 includes particular options, additional and/or alternative options may be included that correspond to examples disclosed herein. For example options corresponding to a supply voltage level and corresponding thresholds may be included in the interface 900.

Figure 10:
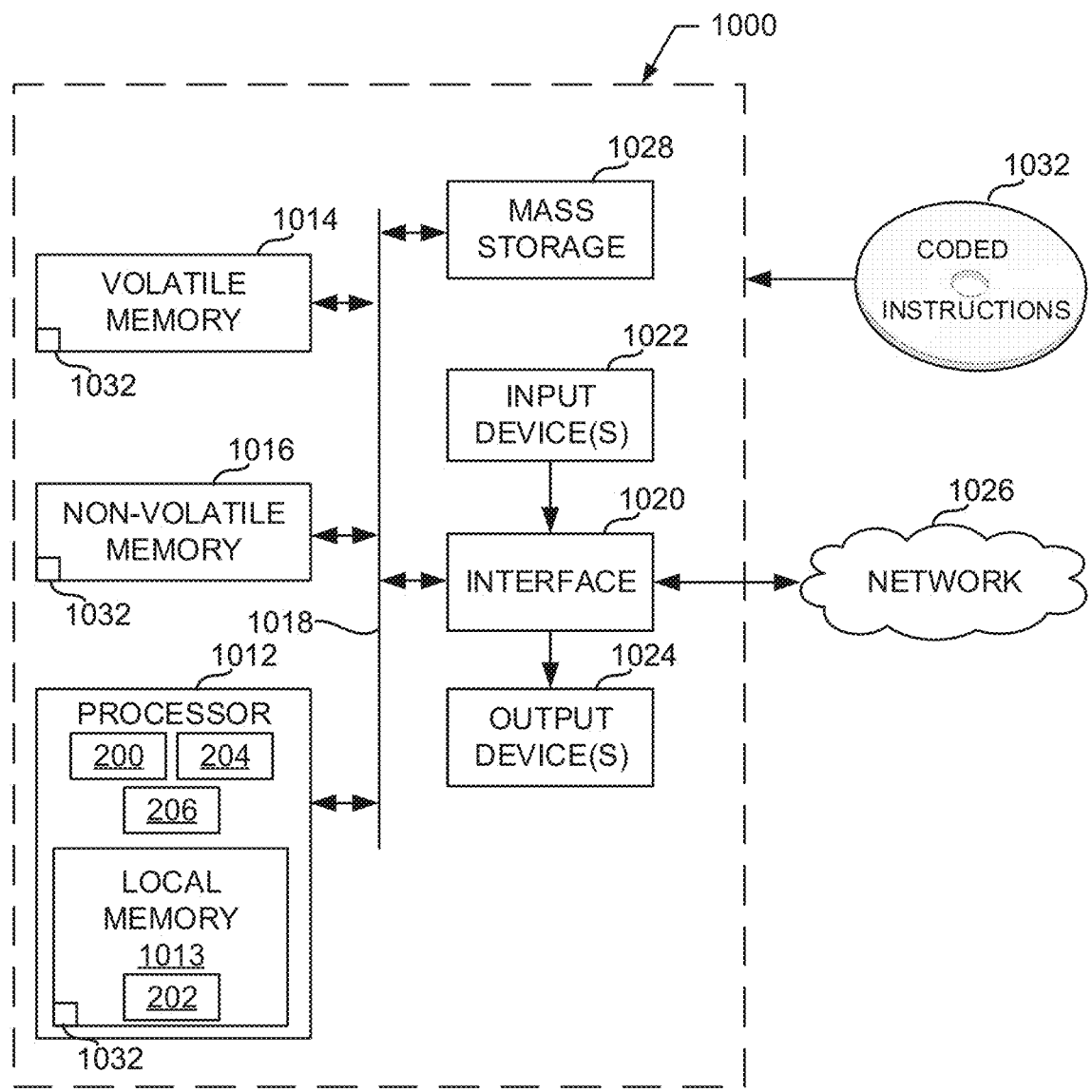
FIG. 10 is a block diagram of an example processor platform structured to execute the instructions of FIG. 3-8 to implement the power control unit of FIG. 2.

FIG. 10 is a block diagram of an example processor platform 1000 structured to execute the instructions of FIGS. 3-8 to implement the example power control unit 106 of FIGS. 1 and/or 2. The processor platform 1000 can be, for example, a server, a personal computer, a workstation, a self-learning machine (e.g., a neural network), a mobile device (e.g., a cell phone, a smart phone, a tablet such as an iPad™), or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example component interface 200, the example comparator(s) 204, and/or the example clock rate/voltage adjuster 206 of FIG. 2.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller. In some examples, the main memory 1014 implements the example memory 108 and the example local memory 1013 implements the example configuration storage 202 of FIG. 1.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface. In the example of FIG. 10, the interface circuit 1020 implements the interface 200 of FIG. 2. However, the interface 20 may be a separate component from the interface circuit 1020 of FIG. 10.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip, and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIGS. 3-8 may be stored in the mass storage device 1028, in the volatile memory 1014, in the non-volatile memory 1016, and/or on a removable non-transitory computer readable storage medium such as a CD or DVD.

Figure 11:
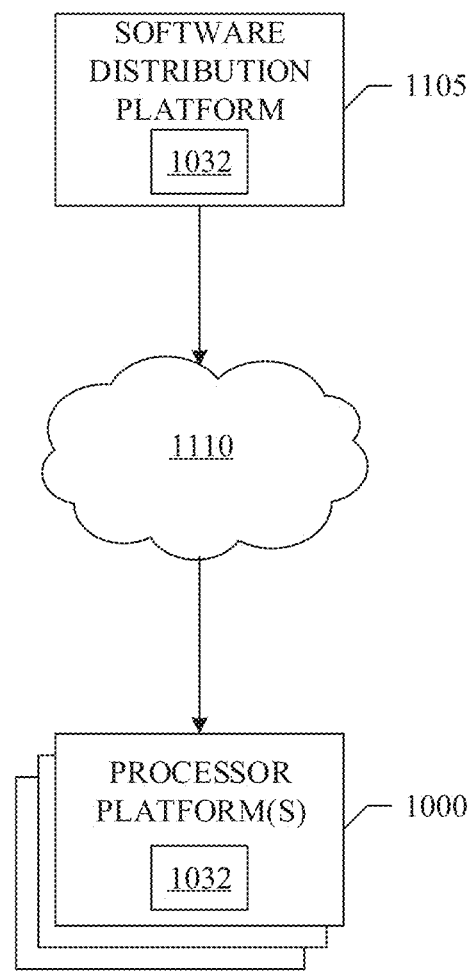
FIG. 11 is a block diagram of an example software distribution platform to distribute software (e.g., software corresponding to the example computer readable instructions of FIGS. 3-8) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1105 to distribute software such as the example computer readable instructions 1032 of FIG. 10 to third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1032 of FIG. 10. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the computer readable instructions 1032, which may correspond to the example computer readable instructions 1032 of FIGS. 3-8, as described above. The one or more servers of the example software distribution platform 1105 are in communication with a network 1110, which may correspond to any one or more of the Internet and/or any of the example networks 1026 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1032 from the software distribution platform 1105. For example, the software, which may correspond to the example computer readable instructions 1032 of FIG. 10, may be downloaded to the example processor platform 1000, which is to execute the computer readable instructions 1032 to implement the power control unit 106 of FIGS. 1 and/or 2. In some example, one or more servers of the software distribution platform 1105 periodically offer, transmit, and/or force updates to the software (e.g., the example computer readable instructions 1032 of FIG. 10) to ensure improvements, patches, updates, etc. are distributed and applied to the software at the end user devices.

Example methods, apparatus, systems, and articles of manufacture to dynamically configure overclocking frequency are disclosed herein. Further examples and combinations thereof include the following: Example 1 includes an apparatus to dynamically configure an overclocking frequency, the apparatus comprising a clock rate adjuster to cause a processor core to operate at a first overclocked clock rate, a comparator to compare a sensed temperature corresponding to the processor core to a threshold, and the clock rate adjuster to, when the sensed temperature satisfies the threshold, decrease a clock rate of the processor core from the first overclocked clock rate by a user-defined amount, the decreased clock rate being above a normal operating clock rate of the processor core.

Example 2 includes the apparatus of example 1, wherein the sensed temperature is a first sensed temperature at a first time, the threshold is a first threshold, and the user-defined amount is a first-user defined amount, wherein the comparator is to compare a second sensed temperature corresponding to the processor core at a second time different than the first time, and the clock rate adjuster is to, when the second sensed temperature corresponding to the processor core satisfies a second threshold, increase the clock rate of the processor core from the decreased clock rate by a second user-defined amount.

Example 3 includes the apparatus of example 2, wherein the second threshold is the first threshold and the second user-defined amount is the first user-defined amount.

Example 4 includes the apparatus of example 1, wherein the first overclocked clock rate is a user-defined overclocked clock rate.

Example 5 includes the apparatus of example 1, wherein the clock rate adjuster is to cause a plurality of cores to operate at the first overclocked clock rate, the plurality of cores including the processor core, the comparator is to determine the threshold based on a number of the plurality of cores that are active, and compare one or more sensed temperatures corresponding to the plurality of active cores to the threshold, and the clock rate adjuster to, when the one or more sensed temperatures satisfy the threshold, decrease the clock rate of the plurality of active cores from the first overclocked clock rate by the user-defined amount.

Example 6 includes the apparatus of example 1, wherein the threshold is a first threshold and the comparator is to compare the sensed temperature to a second threshold, further including a voltage adjuster to, when the sensed temperature satisfies the second threshold, increase a supply voltage of the processor core.

Example 7 includes the apparatus of example 6, wherein the sensed temperature is a first sensed temperature at a first time, wherein the comparator is to compare a second sensed temperature corresponding to the processor core at a second time different than the first time, and the clock rate adjuster to, when the second sensed temperature corresponding to the processor core satisfies a third threshold, decrease the supply voltage of the processor core.

Example 8 includes the apparatus of example 7, wherein the clock rate adjuster is to at least one of increase or decrease the supply voltage by a user defined amount.

Example 9 includes a non-transitory computer readable storage medium comprising instructions which, when executed, cause one or more processors to at least cause a processor core to operate at a first overclocked clock rate, compare a sensed temperature corresponding to the processor core to a threshold, and when the sensed temperature satisfies the threshold, decrease a clock rate of the processor core from the first overclocked clock rate by a user-defined amount, the decreased clock rate being above a normal operating clock rate of the processor core.

Example 10 includes the computer readable storage medium of example 9, wherein the sensed temperature is a first sensed temperature at a first time, the threshold is a first threshold, and the user-defined amount is a first-user defined amount, wherein the instructions cause the one or more processors to compare a second sensed temperature corresponding to the processor core at a second time different than the first time, and when the second sensed temperature corresponding to the processor core satisfies a second threshold, increase the clock rate of the processor core from the decreased clock rate by a second user-defined amount.

Example 11 includes the computer readable storage medium of example 10, wherein the second threshold is the first threshold and the second user-defined amount is the first user-defined amount.

Example 12 includes the computer readable storage medium of example 9, wherein the first overclocked clock rate is a user-defined overclocked clock rate.

Example 13 includes the computer readable storage medium of example 9, wherein the instructions cause the one or more processors to cause a plurality of cores to operate at the first overclocked clock rate, the plurality of cores including the processor core, determine the threshold based on a number of the plurality of cores that are active, and compare one or more sensed temperatures corresponding to the plurality of active cores to the threshold, and when the one or more sensed temperatures satisfy the threshold, decrease the clock rate of the plurality of active cores from the first overclocked clock rate by the user-defined amount.

Example 14 includes the computer readable storage medium of example 9, wherein the threshold is a first threshold and the instructions cause the one or more processors to compare the sensed temperature to a second threshold, and when the sensed temperature satisfies the second threshold, increase a supply voltage of the processor core.

Example 15 includes the computer readable storage medium of example 14, wherein the sensed temperature is a first sensed temperature at a first time, wherein the instructions cause the one or more processors to compare a second sensed temperature corresponding to the processor core at a second time different than the first time, and when the second sensed temperature corresponding to the processor core satisfies a third threshold, decrease the supply voltage of the processor core.

Example 16 includes the computer readable storage medium of example 15, wherein the instructions cause the one or more processors to at least one of increase or decrease the supply voltage by a user defined amount.

Example 17 includes an apparatus to dynamically configure an overclocking frequency, the apparatus comprising memory, and at least one processor to execute instructions to cause a processor core to operate at a first overclocked clock rate, compare a sensed temperature corresponding to the processor core to a threshold, and when the sensed temperature satisfies the threshold, decrease a clock rate of the processor core from the first overclocked clock rate by a user-defined amount, the decreased clock rate being above a normal operating clock rate of the processor core.

Example 18 includes the apparatus of example 17, wherein the sensed temperature is a first sensed temperature at a first time, the threshold is a first threshold, and the user-defined amount is a first-user defined amount, wherein the at least one processor is to compare a second sensed temperature corresponding to the processor core at a second time different than the first time, and when the second sensed temperature corresponding to the processor core satisfies a second threshold, increase the clock rate of the processor core from the decreased clock rate by a second user-defined amount.

Example 19 includes the apparatus of example 18, wherein the second threshold is the first threshold and the second user-defined amount is the first user-defined amount.

Example 20 includes the apparatus of example 17, wherein the first overclocked clock rate is a user-defined overclocked clock rate.

Example 21 includes the apparatus of example 17, wherein the at least one processor is to cause a plurality of cores to operate at the first overclocked clock rate, the plurality of cores including the processor core, determine the threshold based on a number of the plurality of cores that are active, and compare one or more sensed temperatures corresponding to the plurality of active cores to the threshold, and when the one or more sensed temperatures satisfy the threshold, decrease the clock rate of the plurality of active cores from the first overclocked clock rate by the user-defined amount.

Example 22 includes the apparatus of example 17, wherein the threshold is a first threshold and the at least one processor is to compare the sensed temperature to a second threshold, and when the sensed temperature satisfies the second threshold, increase a supply voltage of the processor core.

Example 23 includes the apparatus of example 22, wherein the sensed temperature is a first sensed temperature at a first time, wherein the at least one processor is to compare a second sensed temperature corresponding to the processor core at a second time different than the first time, and when the second sensed temperature corresponding to the processor core satisfies a third threshold, decrease the supply voltage of the processor core.

Example 24 includes the apparatus of example 23, wherein the at least one processor is to at least one of increase or decrease the supply voltage by a user defined amount.

Example 25 includes a method to dynamically configure an overclocking frequency, the method comprising causing a processor core to operate at a first overclocked clock rate, comparing, by executing an instruction with one or more processors, a sensed temperature corresponding to the processor core to a threshold, and when the sensed temperature satisfies the threshold, decreasing, by executing an instruction with the one or more processors, a clock rate of the processor core from the first overclocked clock rate by a user-defined amount, the decreased clock rate being above a normal operating clock rate of the processor core.

Example 26 includes the method of example 25, wherein the sensed temperature is a first sensed temperature at a first time, the threshold is a first threshold, and the user-defined amount is a first-user defined amount, further including comparing a second sensed temperature corresponding to the processor core at a second time different than the first time, and when the second sensed temperature corresponding to the processor core satisfies a second threshold, increasing the clock rate of the processor core from the decreased clock rate by a second user-defined amount.

Example 27 includes the method of example 26, wherein the second threshold is the first threshold and the second user-defined amount is the first user-defined amount.

Example 28 includes the method of example 25, wherein the first overclocked clock rate is a user-defined overclocked clock rate.

Example 29 includes the method of example 25, further including causing a plurality of cores to operate at the first overclocked clock rate, the plurality of cores including the processor core, determining the threshold based on a number of the plurality of cores that are active, and comparing one or more sensed temperatures corresponding to the plurality of active cores to the threshold, and when the one or more sensed temperatures satisfy the threshold, decreasing the clock rate of the plurality of active cores from the first overclocked clock rate by the user-defined amount.

Example 30 includes the method of example 25, wherein the threshold is a first threshold and further including comparing the sensed temperature to a second threshold, and when the sensed temperature satisfies the second threshold, increasing a supply voltage of the processor core.

Example 31 includes the method of example 30, wherein the sensed temperature is a first sensed temperature at a first time, further including comparing a second sensed temperature corresponding to the processor core at a second time different than the first time, and when the second sensed temperature corresponding to the processor core satisfies a third threshold, decreasing the supply voltage of the processor core.

Example 32 includes the method of example 31, further including at least one of increase or decrease the supply voltage by a user defined amount.

Example 33 includes an apparatus to dynamically configure an overclocking frequency, the apparatus comprising means for causing a processor core to operate at a first overclocked clock rate, means for comparing a sensed temperature corresponding to the processor core to a threshold, and the means for causing the processor core to operate is to, when the sensed temperature satisfies the threshold, decrease a clock rate of the processor core from the first overclocked clock rate by a user-defined amount, the decreased clock rate being above a normal operating clock rate of the processor core.

Example 34 includes the apparatus of example 33, wherein the sensed temperature is a first sensed temperature at a first time, the threshold is a first threshold, and the user-defined amount is a first-user defined amount, wherein the means for comparing is to compare a second sensed temperature corresponding to the processor core at a second time different than the first time, and the means for causing the processor core to operate is to, when the second sensed temperature corresponding to the processor core satisfies a second threshold, increase the clock rate of the processor core from the decreased clock rate by a second user-defined amount.

Example 35 includes the apparatus of example 34, wherein the second threshold is the first threshold and the second user-defined amount is the first user-defined amount.

Example 36 includes the apparatus of example 33, wherein the first overclocked clock rate is a user-defined overclocked clock rate.

Example 37 includes the apparatus of example 33, wherein the means for causing the processor core to operate is to cause a plurality of cores to operate at the first overclocked clock rate, the plurality of cores including the processor core, the means for comparing is to determine the threshold based on a number of the plurality of cores that are active, and compare one or more sensed temperatures corresponding to the plurality of active cores to the threshold, and the means for causing the processor core to operate to, when the one or more sensed temperatures satisfy the threshold, decrease the clock rate of the plurality of active cores from the first overclocked clock rate by the user-defined amount.

Example 38 includes the apparatus of example 33, wherein the threshold is a first threshold and the means for comparing is to compare the sensed temperature to a second threshold, further including means for increasing a supply voltage of the processor core when the sensed temperature satisfies the second threshold.

Example 39 includes the apparatus of example 38, wherein the sensed temperature is a first sensed temperature at a first time, wherein the means for comparing is to compare a second sensed temperature corresponding to the processor core at a second time different than the first time, and the means for causing the processor core to operate to, when the second sensed temperature corresponding to the processor core satisfies a third threshold, decrease the supply voltage of the processor core.

Example 40 includes the apparatus of example 39, wherein the means for causing the processor core to operate is to at least one of increase or decrease the supply voltage by a user defined amount.

From the foregoing, it will be appreciated that example methods, apparatus and articles of manufacture have been disclosed herein to dynamically configure overclocking frequency. Disclosed methods, apparatus and articles of manufacture improve the efficiency of a computer by enabling allowing the computer to toggle between overclocked clock rates to operate at an increased speed without risk of reaching a maximum temperature. Disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to dynamically configure an overclocking frequency, the apparatus comprising:
   adjuster circuitry to cause a processor core to operate at a first overclock rate;
   a comparator to:
      determine a temperature threshold based on a number of a plurality of cores that are active, the plurality of cores including the processing core; and
      compare a sensed temperature corresponding to the processor core to the temperature threshold; and
   the adjuster circuitry to, when based on the sensed temperature satisfying the temperature threshold, decrease a clock rate of the plurality of cores from the first overclock rate, the decreased clock rate being above a normal operating clock rate of the processor core.

2. The apparatus of claim 1, wherein the sensed temperature is a first sensed temperature at a first time and the temperature threshold is a first temperature threshold, wherein:
   the comparator is to compare a second sensed temperature corresponding to the processor core at a second time different than the first time; and
   the adjuster circuitry is to, based on the second sensed temperature corresponding to the processor core satisfying a second temperature threshold, increase the clock rate of the processor core from the decreased clock rate.

3. The apparatus of claim 2, wherein the second temperature threshold is the first temperature threshold.

4. The apparatus of claim 1, wherein the first overclock rate is a user-defined overclock rate.

5. The apparatus of claim 1, wherein the temperature threshold is a first temperature threshold and the comparator is to compare the sensed temperature to a second temperature threshold, further including:
   a voltage adjuster to, based on the sensed temperature satisfying the second temperature threshold, increase a supply voltage of the processor core.

6. The apparatus of claim 5, wherein the sensed temperature is a first sensed temperature at a first time, wherein:
   the comparator is to compare a second sensed temperature corresponding to the processor core at a second time different than the first time; and
   the adjuster circuitry to, based on the second sensed temperature corresponding to the processor core satisfies satisfying a third temperature threshold, decrease the supply voltage of the processor core.

7. The apparatus of claim 6, wherein the adjuster circuitry is to at least one of increase or decrease the supply voltage by a user defined amount.

8. A non-transitory computer readable storage medium comprising instructions which, when executed, cause one or more processors to at least:
cause a processor core to operate at a first overclock rate;
determine a temperature threshold based on a number of a plurality of cores that are active, the plurality of cores including the processing core; and
compare a sensed temperature corresponding to the processor core to the temperature threshold; and
based on the sensed temperature satisfying the temperature threshold, decrease a clock rate of the plurality of cores from the first overclock rate, the decreased clock rate being above a normal operating clock rate of the processor core.

9. The computer readable storage medium of claim 8, wherein the sensed temperature is a first sensed temperature at a first time and the temperature threshold is a first temperature threshold, wherein the instructions cause the one or more processors to:
compare a second sensed temperature corresponding to the processor core at a second time different than the first time; and
based on the second sensed temperature corresponding to the processor core satisfying a second temperature threshold, increase the clock rate of the processor core from the decreased clock rate.

10. The computer readable storage medium of claim 9, wherein the second temperature threshold is the first temperature threshold.

11. The computer readable storage medium of claim 8, wherein the first overclock rate is a user-defined overclock rate.

12. The computer readable storage medium of claim 8, wherein the temperature threshold is a first temperature threshold and the instructions cause the one or more processors to:
compare the sensed temperature to a second temperature threshold; and
based on the sensed temperature satisfying the second temperature threshold, increase a supply voltage of the processor core.

13. The computer readable storage medium of claim 12, wherein the sensed temperature is a first sensed temperature at a first time, wherein the instructions cause the one or more processors to:
compare a second sensed temperature corresponding to the processor core at a second time different than the first time; and
based on the second sensed temperature corresponding to the processor core satisfying a third temperature threshold, decrease the supply voltage of the processor core.

14. The computer readable storage medium of claim 13, wherein the instructions cause the one or more processors to at least one of increase or decrease the supply voltage by a user defined amount.

15. An apparatus to dynamically configure an overclocking frequency, the apparatus comprising:
memory; and
at least one processor to execute instructions to:
cause a processor core to operate at a first overclock rate;
determine a temperature threshold based on a number of a plurality of cores that are active, the plurality of cores including the processing core; and
compare a sensed temperature corresponding to the processor core to the temperature threshold; and
based on the sensed temperature satisfying the temperature threshold, decrease a clock rate of the plurality of cores from the first overclock rate, the decreased clock rate being above a normal operating clock rate of the processor core.

16. The apparatus of claim 15, wherein the sensed temperature is a first sensed temperature at a first time and the temperature threshold is a first temperature threshold, wherein the at least one processor is to:
compare a second sensed temperature corresponding to the processor core at a second time different than the first time; and
based on the second sensed temperature corresponding to the processor core satisfying a second temperature threshold, increase the clock rate of the processor core from the decreased clock rate.

17. The apparatus of claim 16, wherein the second temperature threshold is the first temperature threshold.

18. The apparatus of claim 15, wherein the first overclock rate is a user-defined overclock rate.

19. The apparatus of claim 15, wherein the temperature threshold is a first temperature threshold and the at least one processor is to:
compare the sensed temperature to a second temperature threshold; and
based on the sensed temperature satisfying the second temperature threshold, increase a supply voltage of the processor core.

20. The apparatus of claim 19, wherein the sensed temperature is a first sensed temperature at a first time, wherein the at least one processor is to:
compare a second sensed temperature corresponding to the processor core at a second time different than the first time; and
based on the second sensed temperature corresponding to the processor core satisfying a third temperature threshold, decrease the supply voltage of the processor core.

21. The apparatus of claim 20, wherein the at least one processor is to at least one of increase or decrease the supply voltage.

22. A method to dynamically configure an overclocking frequency, the method comprising:
determining, by executing an instruction with one or more processors, a temperature threshold based on a number of a plurality of cores that are active, the plurality of cores including a processing core; and
causing a processor core to operate at a first overclock rate;
comparing, by executing an instruction with the one or more processors, a sensed temperature corresponding to the processor core to the temperature threshold; and
based on the sensed temperature satisfying the temperature threshold, decreasing, by executing an instruction with the one or more processors, a clock rate of the processor core from the first overclock rate by a user-defined amount, the decreased clock rate being above a normal operating clock rate of the processor core.

23. The method of claim 22, wherein the sensed temperature is a first sensed temperature at a first time, the temperature threshold is a first temperature threshold, and the user-defined amount is a first-user defined amount, further including:

comparing a second sensed temperature corresponding to the processor core at a second time different than the first time; and based on the second sensed temperature corresponding to the processor core satisfying a second temperature threshold, increasing the clock rate of the processor core from the decreased clock rate by a second user-defined amount.

24. The method of claim 23, wherein the second temperature threshold is the first temperature threshold.

25. The method of claim 22, wherein the first overclock rate is a user-defined overclock rate.

* * * * *

UNITED STATES PATENT AND TRADEMARK OFFICE
CERTIFICATE OF CORRECTION

PATENT NO. : 12,013,719 B2  
APPLICATION NO. : 17/130982  
DATED : June 18, 2024  
INVENTOR(S) : Ragland et al.

Page 1 of 1

It is certified that error appears in the above-identified patent and that said Letters Patent is hereby corrected as shown below:

In the Claims

Column 24, Claim 1, Line 33, Delete "when".

Column 24, Claim 6, Line 67, Delete "satis-".

Column 25, Claim 6, Line 1, Delete "fies".

Column 26, Claim 21, Line 45, Delete "voltage." and insert --voltage by a user defined amount.--.

Signed and Sealed this  
Twenty-fourth Day of June, 2025

Coke Morgan Stewart  
*Acting Director of the United States Patent and Trademark Office*